Dec. 15, 1970 A. W. BIDWELL ET AL 3,548,386

ASSOCIATIVE MEMORY

Filed July 15, 1968

INVENTORS
ALEXANDER W. BIDWELL
ARNOLD WEINBERGER

BY W. J. Roberts

ATTORNEY

United States Patent Office 3,548,386
Patented Dec. 15, 1970

3,548,386

ASSOCIATIVE MEMORY

Alexander W. Bidwell, Wappingers Falls, and Arnold Weinberger, Newburgh, N.Y., assignors to International Business Machines Corporation, Armonk, N.Y., a corporation of New York Filed July 15, 1968, Ser. No. 744,718
Int. Cl. G11c *11/40*
U.S. Cl. 340—173 10 Claims

ABSTRACT OF THE DISCLOSURE

Storage elements arranged in a conventional row and and column array for coincident selection and having a common bit-sense wire are used in an associative memory without changing the interconnecctions between storage elements. Storage elements of each row form a memory word and a single row or Y dimension wire is selected for each operation. The array columns form bit positions and the column or X dimension wires are selected according to the bit value to be searched or written in the corresponding bit position. When one Y wire and selected X wires are energized, a signal on the bit-sense wire signifies a mismatch with the data value represented by energization of the X wire. A signal applied to the bit-sense wire in coincidence with a Y wire and selected X wires stores a predetermined data value at the selected bit position.

INTRODUCTION

Since this invention relates to an associative memory using non-associative memory storage elements, it will be helpful to review some of the features that are common to associative and non-associative memories and some of their differences. Each is made up of bistable storage elements, preferably transistor flip flops, that individually store either a binary one or a binary zero. Groups of storage elements store a unit of data that is called a word. Each storage elements of a word stores a bit for a particular bit position of the word. A word of data can be read by energizing wires that locate the word and by sensing the signals that the storage elements of each bit position produce on a sense wire. A word of data can be written into a particular location by energizing the wires that locate the word and by energizing other wires, called bit wires, that are unique to a particular bit position. The signals applied to the bit wires establish whether the write operation will result in storing a one or a zero in the storage elements that the bit wire is coupled to. The operation of locating the cells of a particular word is called addressing.

Associative memories differ from non-associative memories in the circuits and the operations for addressing. In an associative memory, a word location is addressed according to its contents. The storage elements are arranged for comparing the contents of each word of the memory with an interrogate word that is held in an interrogate register. Sensing circuits and a match register are provided for each word for sensing a mismatch signal produced by any storage cell of the word and for identifying the matching words for subsequent operations. By contrast, in a non-associative memory, a word called an address is supplied to the memory and addressing circuits of the memory select the appropriate word location without regard to its contents.

In an associative memory the storage elements are usually located in a row and column array. Bit drive and sense wires interconnect the storage elements of the same bit position along the columns (arbitrarily) and word drive and sensing wires interconnect the elements of the same word in the row direction. This organization is particularly advantageous for the interrogate operation of an associative memory. The column wires are energized according to the binary value of the corresponding bit of the interrogate word, and the word sense wires along the rows carry any resulting mismatch signals. During read and write operations the row wires carry selection signals for the selected word. The column wires carry bit signals during a write operation and carry signals from the storage elements to sensing circuits during a read operation. From the row and column arrangement, such a memory organization is called 2 dimensional or 2D.

Non-associative memories often use an organization that is called 3D. The three dimensions are commonly called X, Y, and bit. Instead of a row of elements for each bit position, such a memory has a series of 2 dimensional arrays, one for each bit position. In each array the storage elements are arranged in rows and columns and they are interconnected along their rows and columns to addressing circuits in such a way that coincident selection of one row and one column in each array selects only the storage element at the intersection of the row and column. The two addressing dimensions in such an organization are commonly called X and Y.

These differences between 2D and 3D are particularly significant in monolithic memories where the wiring patterns that have been described are an integral part of a monolithic structure and are costly to change. A general object of this invention is to provide a new and improved organization for an associative memory in which arrays of storage elements that are wired for 3D addressing are interconnected with other components to form an associative memory.

THE INVENTION

According to this invention, 3D connected arrays of storage elements are connected so that rows (arbitrarily) of storage elements function as words and columns function as bit positions, as in the 2D organization already described. A more specific object of this invention is to provide a memory design that is readily adaptable to provide either a high speed relatively low capacity memory or to provide a larger capacity memory that is slower. In the faster embodiment, a single Y (or row) wire of each array is permanently selected for read, write and interrogate operations that are controlled by suitably energizing other wires of the array. Thus, one array preferably monolithic, is provided for each word of the memory. For greater capacity but slower speed, means is provided for selecting any Y wire in each array and for stepping through the rows of the array for operating at each Y position of the memory in sequence. The corresponding Y position in each array is selected. Since the faster embodiment is somewhat simpler, the description will be directed to this embodiment except where it is appropriate to explain the circuits and the operations for stepping through the Y positions.

With this arrangement, a single bit and sensing circuit is common to all the storage elements of each word or array. In the memory that will be described in detail later, two transistors of each storage element are each connected to a different one of two wires that similarly interconnect all the storage elements of the array. One wire carries a signal during a write operation to set an addressed storage element into its one storing state and carries a signal from the storage elements during a read operation that represents a stored zero. This wire will be called bit-one or sense-zero according to the function referred to. The other wire similarly functions for writing zeros and for sensing ones and will be called bit-zero, sense-one. From a more general standpoint, an array, or a segment of an array, has at least one wire that interconnects all of the storage elements to carry signals representing a particular storage state and it has the same means or additional means interconnecting the storage elements to function as a bit wire for writing ones or zeros.

The X wires for a particular bit position of each array are interconnected to be energized according to an interrogate word or a word to be written into the memory. Thus, appropriately energizing one Y wire and one X wire produces a read operation on the corresponding storage element of each array. Means are provided for stepping through the X wires in sequence to read a word, or several words, serially by bit from the memory.

For an interrogate operation, the X wires are energized according to an interrogate word. At a storage element location, the interrogate operation is essentially identical to the read operation just described. The storage element energizes its sense-one wire if it has been storing a one and it energizes its sense-zero wire if it has been storing a zero. Because the signals on the X wires do not indicate whether the interrogation is for a one or a zero, the interrogation cannot be performed directly in a single step. Each cell provides a single bit and energizing one X wire causes a cell to produce its output; therefore, such an operation by itself does not signify a match or a mismatch for the word. It will be helpful to consider first how the interrogate operation might be performed in two steps. In one step an X wire would be energized for each bit position that was to be interrogated for a one. Only the sense-zero wires would be used to detect a mismatch signifying signal. Storage elements in the one storing state would energize a sense-one wire and their outputs would go undetected. Storage elements in the zero storing state would energize a sense-zero wire and the signal would be interpreted as a mismatch for the associated word. In the other step, the X wires would be energized for each bit position that was to be interrogated for a zero, and mismatch signals would be detected on the sense-one wire.

In the preferred memory, means is provided for searching all the bit positions of a word in a single operation. Each row of the memory has two storage locations for each bit of the word being stored. In order to locate both parts of a word on the same monolithic structure (which is not necessary), the same sense wire is used for all the storage elements of a word, arbitrarily the sense-one wire, and the word is stored in its true and its complement forms. The operation on the true portion has been described already, the X wires are energized only where a zero appears in the interrogate word; a one stored in an interrogated position produces a signal on the sense-one wire that is interpreted as a mismatch. The complement output on the sense-one wire signifies that a position interrogated for a one contained a one in the complement form but a zero and therefore a mismatch in its true form. Considered from another standpoint, each bit of a word has two storage elements (true and complement) and two X wires which may be energized selectively; the mismatch signals for any position appear on the sense-one wire and the match signals appear on the sense-zero wire where they are disregarded. Thus both types of mismatch are detected simultaneously.

Circuitry is provided for performing a write operation in two steps. In one step, the bit-one wire is energized to write ones and the X wires are energized for the positions that are to store ones. In the other step, the bit-zero wire is energized and the X wires are energized for the positions that are to store zeros. Circuits are provided for energizing the bit wires of a single array or of several selected arrays during a write operation. Thus the Y wires and the bit wires form a two dimensional word selection arrangement with reduced addressing circuitry.

The foregoing and other objects, features and advantages of the invention will be apparent from the following more particular description of the preferred embodiment of the invention, as illustrated in the accompanying drawings.

THE DRAWING

THE PREFERRED EMBODIMENT

Figure 1:
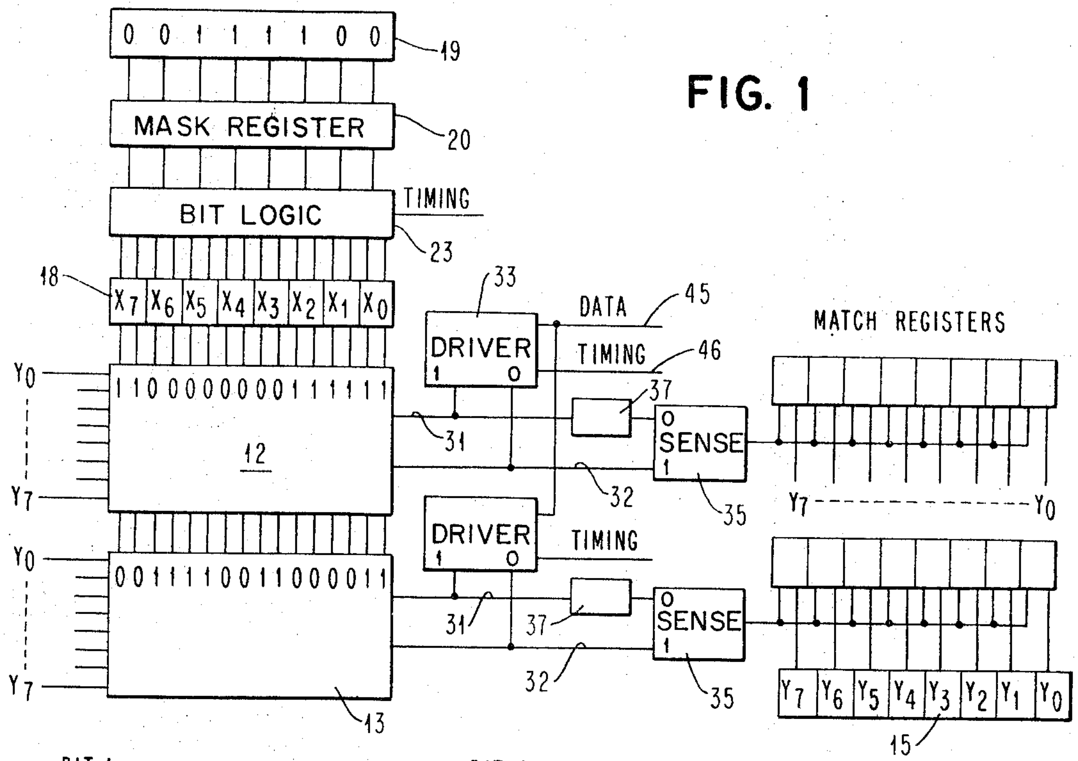
FIG. 1 shows the preferred memory diagrammatically.

As FIG. 1 shows, the preferred memory includes several arrays, 12, 13 of monolithic storage elements. Each array includes a monolithic storage element at each intersection of eight Y or row wires and sixteen X or column wires. Each of the eight rows in each array, designated Y0 through Y7, forms a word of the memory. Selecting a particular Y wire within an array enables the storage elements of the associated row to undergo memory operations in response to other signals. Only one Y wire at a time in each array is selected and the other Y wires are unselected. For high speed operation, one wire of each array (e.g. wire Y0) is permanently selected and the other seven wires are deselected. With this arrangement each array provides a single word of the memory. For a slower operation using all eight words of each array, a set of drivers 15 is provided for selecting any one Y position throughout the arrays. In the drawing, the interconnections between the drivers 15 and the arrays are indicated by the designating letters on the wires of the arrays and on the drivers. A driver is essentially a switch and suitable drivers are well known. Means (not shown) is provided for selecting a particular driver and for stepping serially through the Y positions (as the explanation of the operation will explain more fully). The memory can be provided with any desired number of words by extending the number of arrays in the column direction.

Outside the array the X wires are connected to function, as bit position wires. X wires for the same bit position are connected to be energized together in each array. Each array has sixteen storage elements in each row for storing an eight bit word in its true and its complement forms. A set of X drivers is provided for energizing selected X wires. The X drivers are designated X0 through X7 according to the bit positions of the eight bit true and complement parts of the stored word. The two outputs associated with each X wire are connected to the true and the complement storage elements for the corresponding bit positions.

The memory includes a register 19 that functions as a data register for a write operation and as an interrogate register for an interrogate operation. A conventional mask register 20 is provided to permit search operations on only selected bit positions of the memory. A bit logic circuit 23 couples the 8 outputs of the mask register to the sixteen inputs of the X drivers. The bit logic circuit selects the X drivers according to the contents of registers 19 and 20 and according to the operation the memory is performing. The circuit details will be apparent from the description later of the function of the bit logic circuit during the read, write, and interrogate operations.

Each storage element of an array is connected to a bit-one, sense-zero wire 31 and a bit-zero, sense-one wire 32. A driver 33 is provided for energizing wire 31 for writing a 1 into cells that are selected by the X and Y wires already described and for energizing the wire 32 for similarly writing a zero in a separate operation. A differential sense amplifier 35 is provided for each array. One input of the sense amplifier is connected to wire 32 to receive signals that represent a one storage state of a storage element. The other input corresponds to a zero input in a non-associative memory and is connected through an isolating network 37 to the bit sense wire 31.

Figure 3:
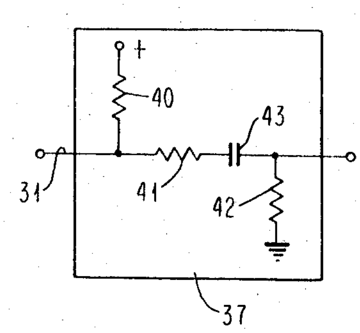
FIG. 3 shows a portion of the memory bit-sensing circuitry schematically.

FIG. 3 shows the details of the isolating network. A network of resistors 40, 41, 42 and a capacitor 43 are arranged to couple only one input of the differential sense amplifier to receive signals but to preserve the advantages of using a differential circuit. The network maintains a voltage level at the sense zero input to cause the amplifier to signify a zero at its output except when a signal appears at the sense one input. It also provides electrical termination for the sense zero wire and the driver. It also prevents the match signals on the sense-zero wire from producing a noise signal on the sense-one wire that could produce a false mismatch signal; the noise that is coupled from the sense-zero wire to the sense-one wire and the one input of the amplifier is similarly coupled by network 37 to the zero input and thereby canceled in the amplifier. The bit drivers 33 of the memory are interconnected to a common data line 45 that controls whether the driver is to energize its one output or its zero output. Each driver has an individual timing wire input 46 that is operable to select a particular driver or several selected drivers for write operations. Preferably the timing inputs are energized by conventional circuitry according to the results of an interrogate operation.

During an interrogate operation, the sense amplifier 35 produces a binary output that signifies a match or mismatch in the associated word. For the high speed operation in which a single word in each array is accessible, a latch is provided at the output of the sense amplifier to store the results of an interrogation. The drawing shows the embodiment in which each word in the array is accessible; preferably a match indicator is provided for each Y position of each array. Each register is connected to be set in response to the coincidence of the output of sense amplifier 35 and a signal that indicates that the corresponding Y position of the memory has been addressed. As the drawing shows the invention, the Y drivers 15 control corresponding stages of the match register.

Conventional features for supplying input signals to the system and for operating on the output of the match registers are not shown in the drawing, but will be explained as they occur in the operating sequence that will be explained later. It will be helpful to review the preferred storage element and to then consider the operation of the memory.

Figure 2:
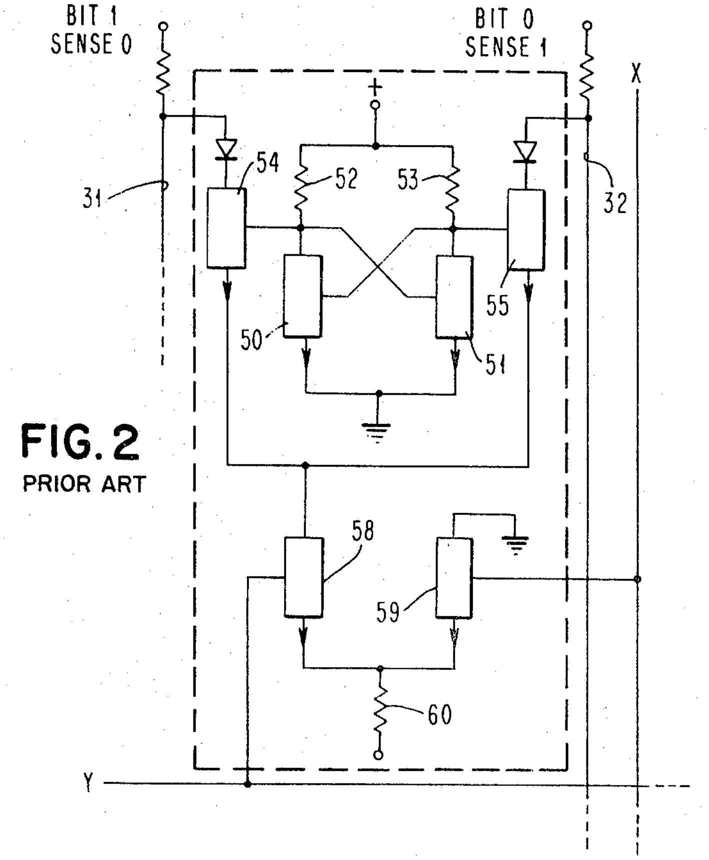
FIG. 2 PRIOR ART
FIG. 2 shows the preferred storage cell schematically.

The storage cell of FIG. 2 is based on the storage element that is described in U.S. Pat. 3,354,440 to A. S. Farber and E. S. Schlig. Transistors 50 and 51 are interconnected with resistors 52 and 53 between two potential points to form a bistable circuit. Transistor 50 conducts to store binary zero and transistor 51 conducts to store binary one. In this bi-stable circuit the base terminal of each transistor 50, 51 is connected to the collector terminal of the other transistor; thus the collector terminals are input terminals for receiving signals from the bit wires 31 and 32 for write operations and they provide the outputs for a read and interrogate operation. The collector terminals of transistors 54 and 55 are coupled to bit wires 31 and 32 such that signals on the bit wires permit selecting of one of the transistors 54, 55 to conduct during interrogate and write operations and such that signals from the storage elements appear on one of the bit-sense wires during a read or interrogate operation. The emitter terminals of transistors 54, 55 are connected together and are controllably connected to a point of suitable potential through a current switching circuit made up of two transistors 58 and 59 and a resistor 60. The circuit operates for interrogate, read, or write when transistor 58 is on and transistor 59 is off in response to suitable signals on the X and Y wires. During a write operation, transistor 58 is turned on to select the storage element and either bit wire 31 or 32 is energized to turn on the associated transitor 54 or 55 and to turn off the associated transistor 50 or 51 of the bi-stable circuit. Since the bit-sense wires are common to an entire array, ones and zeros are written in separate operations, but any storage element selected by the single Y wire and the selected X wires can undergo a write operation. During a read operation and an interrogate operation, the storage elements are selected by a single Y wire and one or more X wires and signals appear on the sense-one and sense-zero wires according to the storage state of the element.

OPERATION

Write

A write operation requires the coincident selection of a Y wire, an X wire, and either a bit-one wire or a bit-zero wire. The selection of a Y wire has already been explained. The bit wires 31, 32 are energized selective according to a data input 45 to all the drivers and timing selection signals peculiar to each driver to control the writing of a one or a zero. Thus the wires 31, 32 and the timing selection provide a selection dimension of the memory. The bit wires are also controlled according to timing inputs 46 that permit selecting a particular word or group of words of the memory. Inputs 46 are typically energized from the match registers as a result of a preceding interrogate operation that locates an array that is to be written into. A write operation takes place in two steps. In one step the driver 33 of a selected word is controlled to energize the bit-one wire 31. In the other step the driver is controlled to energize the bit-zero wire 32. While the bit-one wire is energized, the X wires are energized for the positions where a one is to be written and while the bit-zero wire is energized the X drivers are energized for the positions where a zero is to be written.

The eight bit word to be written in the memory is placed in register 19 and a write timing signal is applied to the bit logic circuit to establish the appropriate connections between the eight outputs of registers 19 and 20 and the sixteen inputs to the X drivers. During the step of writing ones, an X driver is controlled to energize its true output if the bit in register 19 is a one and to energize its complement output if the bit in register 19 is a zero. As will be explained next, storage elements containing a one are capable of producing mismatch signals and elements storing a zero do not produce mismatch signals.

Interrogate

An interrogate operation requires coincident selection of an X wire and a Y wire. Mismatch signals appear on the sense-one wire 32 and are detected in sense amplifier 35 and stored in a match register. The interrogation takes place in a single step. The interrogate word is placed in the register 19 and the mask register 20 is set to transmit signals from the bit positions that are to be interrogated to the bit logic circuit 23. The bit logic circuit directs one valued signals to the complement portion of the driver for the corresponding bit position and it directs zero valued signals to the true portion of the array. Stated from a somewhat different standpoint, the true portion of a bit position is energized to produce a read operation if the value of the interrogate bit is a zero and the complement portion of a bit position is energized to produce a read operation if the value of the interrogate bit is a one.

The drawing shows an eight bit word 00111100 in the interrogate register 19, and two words 11000000 and 00111100 stored in arrays 12 and 13 respectively. To more easily show that the word of array 12 is a mismatch and the word of array 13 is a match, the true portion of each word is shown in the leftmost eight bit positions. The leftmost bit of the interrogate word is a zero and is interrogated in the true portion of the array. Therefore, the storage element containing the leftmost bit of the two words shown in the arrays for this example is energized. Since this storage element in array 12 is storing a one, it energizes its sense-one output and a signal appears at the input 32 of the sense amplifier 35. The sense amplifier produces an output that is stored in the match register that signifies for a subsequent operation that the word of array 12 does not match the interrogate word. Matches or additional mismatches at other positions of this word would have no further effect on state of the match register.

Since the leftmost bit of the word of array 13 is a zero, the corresponding storage element energizes its sense-zero output during the interrogate operation. Since the sense-zero wire 31 is isolated from the sense amplifier, the output of this storage element does not appear at the input of the sense amplifier and the match register is unaffected by this portion of the interrogate operation.

At position X5, the interrogate bit is a one, this signal is directed by the bit logic circuit 23 to the complement output of the X driver for bit position 5. In the example of the drawing this bit is a one in the true word but is a zero in the complement portion where the interrogation for this bit position occurs. Thus this storage element of array 13 produces an output on its sense-zero wire and thereby does not register a mismatch. Similarly, at each of the interrogated eight positions of the word of array 13, zero storing cells are interrogated and no mismatch signal occurs.

Read

For a read operation the bit logic circuit is controlled to step through the eight true positions to serially read a selected word or several words. Signals appear on the sense-one wire to signify a stored one. Signals which appear on the sense-zero wire to signify a stored zero are isolated from the sense amplifier by network 37. Thus a change in signal level at the output of the sense amplifier signifies a one and the absence of a change signifies a zero. Register 19 may conveniently be used to store a word being read from the memory.

The memory as it is shown in FIG. 1 can be provided with additional logic for operation as either an associative memory or a nonassociative memory. As a nonassociative memory, one X position and one Y position are addressed to select one storage element in each array. Data signals are directed individually to the data inputs of the drivers 33 (in contrast to the common connection of FIG. 1) and timing signals are directed to the driver timing inputs in common (in contrast to the individual connections of FIG. 1).

The memory is also operable to produce don't care states when both storage elements of a bit position store a zero. Similarly, a permanent mismatch occurs where ones are stored in the two locations. The read operation just described can be modified for a read complement operation by reading the complement X wires. An interrogation for only mismatching ones or mismatching zeros can be provided by selectively energizing the X wires.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A two dimensional memory comprising,
   a plurality of arrays of storage elements interconnected along columns and rows to X and Y dimension address wires that are energizable to select only those elements having both X and Y wires energized and having common bit-sense wire means interconnecting all the elements to carry signals from the elements and to supply data signals to the elements for a write operation,
   means interconnecting corresponding Y wires of each array, means for energizing any single set of interconnected Y wires to select a word of data in each array,
   means interconnecting corresponding X wires of different arrays to define bit positions in the words, register means and means connecting said X wires to be energized according to the content of said register means for an interrogate operation or a write operation,
   a latch for each array connected to said common wire to be set on occurrence of a signal, whereby matches and mismatches are recorded during interrogation, and
   means to energize said bit-sense wire means of a selected array in coincidence with said energized ones of said X wires to write a predetermined bit value into selected storage elements.

2. A memory according to claim 1 in which said bit-sense wire means includes two common wires separately energizable for writing one and zero values in said storage elements, whereby energizing X wires for bit positions to store ones and said common wire for writing a one and in a separate operation energizing the other of said X wires and the other common wire writes a word into an array.

3. A memory according to claim 1 in which each word is formed by a first and a second storage element for each bit position and including means interconnecting the common wires of said first positions for each word and interconnecting the common wires of said second position of each word, and means for energizing X wires for said one of said positions for interrogating bit positions of the memory for ones and for energizing X wires for the other positions for interrogating bit positions of the memory for zeros.

4. A memory according to claim 3 including means connecting the corresponding ones of the common wires of said first and second storage elements and means responsive to a word to be stored for energizing said X wires for writing said word in said first positions and the complement of said word in said second positions.

5. A memory according to claim 4 including means connected to sense signals appearing on only one of said two common wires corresponding to a predetermined binary stored value whereby upon interrogation on one position a signal on said one common wire signifies a mismatch with a one and a signal upon interrogation of the other position signifies a mismatch with a zero.

6. A memory according to claim 5 including means connecting said one common wire for one positions with the corresponding common wire of the second positions, and means for storing a word in said of one positions and the complement of said word in said second positions.

7. A memory according to claim 5 in which said sense means comprises a differential amplifier having one input connected to said one of said common wires and including an isolating network connecting the other of said common wires to the other input of said differential amplifiers for balancing noise originating on said other common wire.

8. A memory according to claim 7 in which said isolating network includes means to maintain said amplifier normally in a match signifying output condition.

9. A memory according to claim 6 including means for selectively providing signals on said common wires of said arrays for writing in one location or in a plurality of locations.

10. A memory according to claim 6 including means to energize said X wires in succession for reading serially bit by bit from each word of said memory.

References Cited

UNITED STATES PATENTS

| | | | |
|---|---|---|---|
| 3,292,159 | 12/1966 | Koerner | 340—173 |
| 3,339,181 | 8/1967 | Singleton | 340—173 |
| 3,402,398 | 9/1968 | Koerner | 340—173 |

TERRELL W. FEARS, Primary Examiner

U.S. Cl. X.R.

340—172.5